(12) United States Patent
Nielsen

(10) Patent No.: US 6,819,336 B1
(45) Date of Patent: **\*Nov. 16, 2004**

(54) TOOLTIPS ON WEBPAGES

(75) Inventor: Jakob Nielsen, Atherton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,219

(22) Filed: Apr. 26, 2000

Related U.S. Application Data

(63) Continuation of application No. 09/270,119, filed on Mar. 15, 1999, now Pat. No. 6,078,935, which is a continuation of application No. 08/643,893, filed on May 7, 1996, now Pat. No. 5,937,417.

(51) Int. Cl.[7] ............................................... G09G 5/00
(52) U.S. Cl. .................. 345/711; 345/707; 715/513
(58) Field of Search .............................. 345/336, 337, 345/338, 707, 711; 707/513; 715/513

(56) References Cited

U.S. PATENT DOCUMENTS 5,572,643 A * 11/1996 Judson ....................... 707/531

OTHER PUBLICATIONS

McKinstry "tooltips (in client side image maps)" http://www.acl.lanl.gov/HTML_WG/html-wg-95q4.messages/0462.html, Nov. 5, 1995.*

* cited by examiner

*Primary Examiner*—Matthew Luu
(74) *Attorney, Agent, or Firm*—Finnegan, Henderson, Farabow, Garrett & Dunner, L.L.P.

(57) ABSTRACT

A method and apparatus that allows a Web page designer to specify tooltips for his Web page. Tooltips are text areas that display automatically when the user places the cursor over predetermined text on a display device. The invention also enables Web browser software to display the tooltips specified by the designer. The HTML format extension allows a Web page designer to specify the text over which the user must place the cursor to activate tooltips. The HTML extension also allows the designer to specify the tooltip text that will be displayed when the cursor reaches the specified text. Using the present invention, the designer only needs to specify tooltips for any given information once per page, even though the displayed information may appear multiple times on the Web page.

31 Claims, 9 Drawing Sheets

STATUS

ACCOUNT SUMMARY

Name: Dr. Jakob Nielsen
Userid: jn

Point Balance: 184243 as of 03/11/96

Points Earned Due to Flight Mileage

| Carrier | Flight Date | Flight Number | From City | To City | Flight Miles | Bonus Miles | Total Miles |
|---|---|---|---|---|---|---|---|
| UA | 15-FEB-96 | 0931 | LHR | SFO | 5368 | 6710 | 12078 |
| UA | 01-FEB-96 | 0835 | SFO | HKG | 6914 | 8643 | 15557 |
| UA | 16-DEC-95 | 0073 | EWR | SFO | 2565 | 2565 | 5130 |
| UA | 09-DEC-95 | 0036 | SFO | BOS | 2704 | 2704 | 5408 |
| UA | 21-NOV-95 | 0806 | HKG | SFO | 6914 | 8643 | 15557 |
| UA | 15-NOV-95 | 0835 | SFO | HKG | 6914 | 8643 | 15557 |
| U+ | 15-NOV-95 | 2936 | LAS | SFO | 414 | 621 | 1035 |
| U+ | 12-NOV-95 | 2188 | SFO | LAS | 414 | 414 | 828 |
| UA | 10-NOV-95 | 0931 | LHR | SFO | 5368 | 6710 | 12078 |

210 — <TOOLTIP TXT=tooltip text> displayed info</TOOLTIP>
       └─212─┘└───214───┘└────216────┘

Fig. 2(b)

220 — <TOOLTIP TXT=tooltip text EVERYWHERE> displayed info</TOOLTIP>
       └──────222──────┘└────224────┘└────226────┘

Fig. 2(c)

230 — <TOOLTIP TXT=tooltip text EVERYWHERE BELOW> displayed info</TOOLTIP>
       └──────232──────┘└────234────┘└────236────┘

Fig. 2(d)

240 — <TOOLTIP ALLOFF>

STATUS

ACCOUNT SUMMARY

Name: Dr. Jakob Nielsen
Userid: jn

Point Balance: 184243 as of 03/11/96

Points Earned Due to Flight Mileage

| Carrier | Flight Date | Flight Number | From City | To City | Flight Miles | Bonus Miles | Total Miles |
|---|---|---|---|---|---|---|---|
| UA | 15-FEB-96 | 0931 | LHR | SFO | 5368 | 6710 | 12078 |
| UA | 01-FEB-96 | 0835 | SFO | HKG | 6914 | 8643 | 15557 |
| UA | 16-DEC-95 | 0073 | EWR | SFO | 2565 | 2565 | 5130 |
| UA | 09-DEC-95 | 0036 | SFO | BOS | 2704 | 2704 | 5408 |
| UA | 21-NOV-95 | 0806 | HKG | SFO | 6914 | 8643 | 15557 |
| UA | 15-NOV-95 | 0835 | SFO | HKG | 6914 | 8643 | 15557 |
| U+ | 15-NOV-95 | 2936 | LAS | SFO | 414 | 621 | 1035 |
| U+ | 12-NOV-95 | 2188 | SFO | LAS | 414 | 414 | 828 |
| UA | 10-NOV-95 | 0931 | LHR | SFO | 5368 | 6710 | 12078 |

STATUS

ACCOUNT SUMMARY

Name: Dr. Jakob Nielsen
Userid: jn

Point Balance: 184243 as of 03/11/96

Points Earned Due to Flight Mileage

| Carrier | Flight Date | Flight Number | From City | To City | Flight Miles | Bonus Miles | Total Miles |
|---|---|---|---|---|---|---|---|
| UA | 15-FEB-96 | 0931 | LHR [London Heathrow] | SFO | 5368 | 6710 | 12078 |
| UA | 01-FEB-96 | 0835 | SFO | HKG | 6914 | 8643 | 15557 |
| UA | 16-DEC-95 | 0073 | EWR | SFO | 2565 | 2565 | 5130 |
| UA | 09-DEC-95 | 0036 | SFO | BOS | 2704 | 2704 | 5408 |
| UA | 21-NOV-95 | 0806 | HKG | SFO | 6914 | 8643 | 15557 |
| UA | 15-NOV-95 | 0835 | SFO | HKG | 6914 | 8643 | 15557 |
| U+ | 15-NOV-95 | 2936 | LAS | SFO | 414 | 621 | 1035 |
| U+ | 12-NOV-95 | 2188 | SFO | LAS | 414 | 414 | 828 |
| UA | 10-NOV-95 | 0931 | LHR | SFO | 5368 | 6710 | 12078 |

`<TOOLTIP TXT="London Heathrow"> LHR </TOOLTIP>`

`<TOOLTIP TXT="London Heathrow" EVERYWHERE> LHR </TOOLTIP>`

`<TOOLTIP TXT="London Heathrow" EVERYWHERE BELOW> LHR </TOOLTIP>`

Preprocessing by Browser

Preprocessing by Browser

TOOLTIPS ON WEBPAGES

CROSS-REFERENCE TO RELATED APPLICATION

This application is a continuation of and incorporates by reference co-pending patent application entitled "Tooltips On Webpages" Ser. No. 09/270,119, filed on Mar. 15, 1999 now U.S. Pat. No. 6,078,935, by inventor Jakob Nielsen and which is a continuation and Ser. No. 08/643,893 incorporates by reference now U.S. Pat. No. 5,937,417 entitled "Tooltips On Webpages filed on May 7, 1996.

BACKGROUND OF THE INVENTION

This application relates to the World Wide Web and, in particular, to a software tool for improving the readability of documents on the Web.

The past several years have seen an explosive growth of the internet, and specifically, in the growth of the World Wide Web (hereafter "the Web"). The Web is built around a network of "server" computers which exchange requests and data from each other using the hypertext transfer protocol ("http"). A human designer designs the layout of a Web page and specifies the layout of the page using HTML ("Hypertext Markup Language"). Several versions of HTML are currently in existence. Examples include HTML versions 2.0 and 3.0, as specified by the WWW Consortium of MIT.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

Information presentations on Web pages are often abbreviated or shortened in order to save space and to produce better layouts. Typical examples of abbreviated or shortened information include icons in the toolbars of applications running under a window system or the use of codes in statistical tables. Web pages in particular often include abbreviated forms of information because it is desirable to squeeze as much information as possible into a window without requiring the user to scroll the window.

If the user understands the code or abbreviation used in a Web page, then the information may be understood without any problems. Difficulties may arise, however, if the user does not understand the short form of the information. Designers of Web pages are used to being able to design pages by simple text editing and the use of human-readable HTML tags. What is needed is a convenient way for designers of Web pages to add additional information to their Webpages without having to understand the complex programming tools required to construct graphical user interfaces.

SUMMARY OF THE INVENTION

The present invention overcomes the problems and disadvantages of the prior art by adding an extension to HTML that allows a Web page designer to specify tooltips for the Web page. Tooltips are text areas that display automatically when the user places the cursor over predetermined text on a display device. The invention also enables Web browser software to display the tooltips specified by the designer. The HTML format extension allows a Web page designer to specify the text over which the user must place the cursor to activate tooltips. The HTML extension also allows the designer to specify the tooltip text that will be displayed when the cursor reaches the specified text. Using the present invention, the designer only needs to specify a tooltip for any given information once per page, even though the information may appear multiple times on the Web page.

In accordance with the purpose of the invention, as embodied and broadly described herein the invention is a method of processing HTML that describes a web page, comprising the steps performed by a data processing system, of: receiving HTML describing the web page; reviewing the HTML to locate a tooltip tag in the HTML, the tooltip tag identifying displayed info and associated tooltip information; storing in a memory of the data processing system the region of a display device at which the displayed info will be displayed; storing in the memory the tooltip information; and displaying the Web page in accordance with the HTML.

In further accordance with the purpose of this invention, as embodied and broadly described herein the invention is a method of specifying tooltips on a web page, comprising the steps of: determining a location on the web page for the information for which the tooltip is to be displayed; storing in a memory of a data processing system a tooltip tag having the format <TOOLTIP TXT=tooltip information> displayed info </TOOLTIP>, where the tooltip tag is stored in the memory in a location associated with the location of the displayed info on the web page.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 2(*a*) through 2(*d*) show respective formats of HyperText Markup Language (HTML) tooltip tags in accordance with the embodiment of FIG. 1.

FIG. 3 shows an example of a Web Page displayed on a display device of FIG. 1.

FIG. 4 shows an example of a Web Page with a tooltip displayed thereon in accordance with the present invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
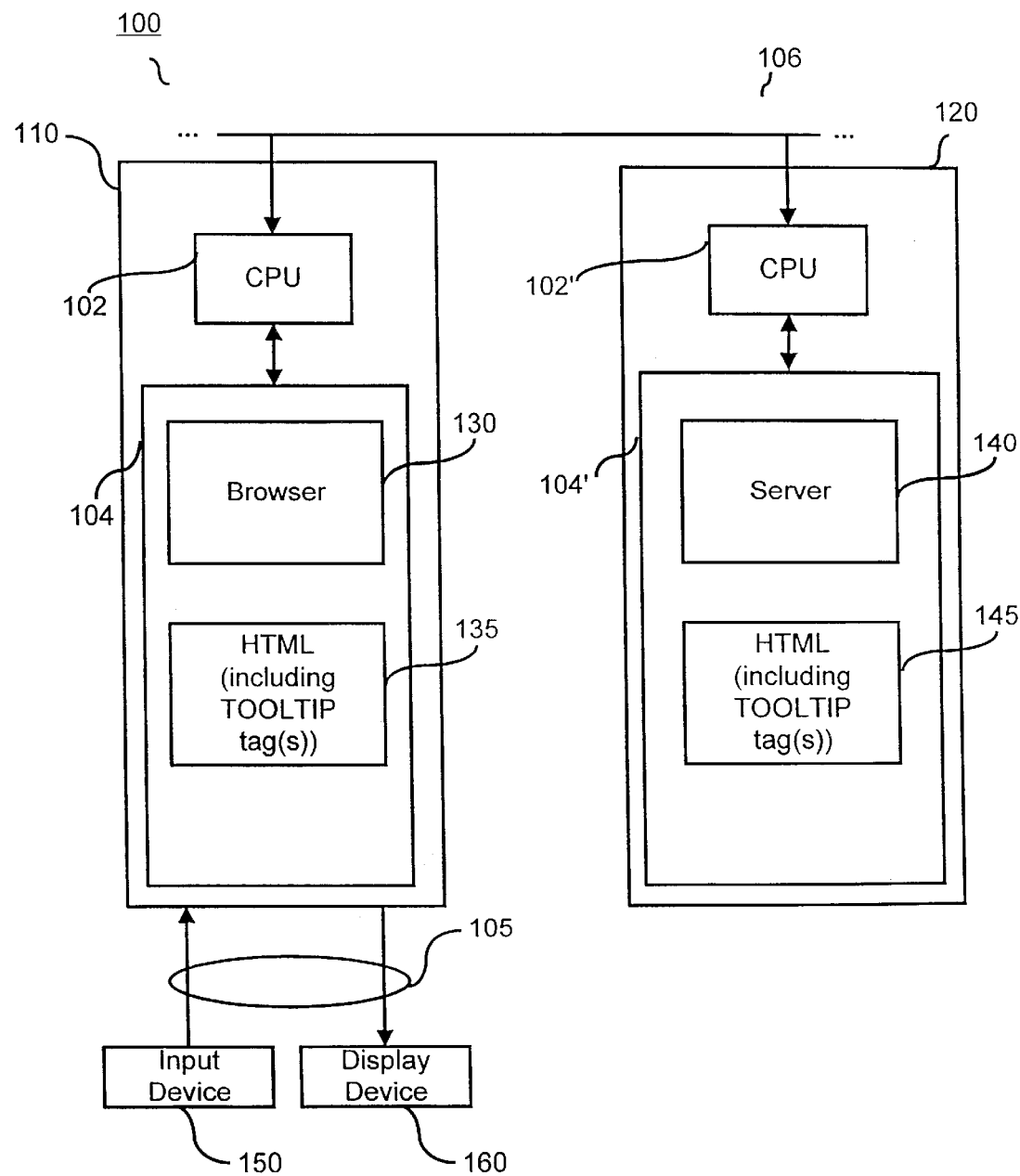
FIG. 1 is a block diagram of a computer system in accordance with a preferred embodiment of the present invention.

FIG. 1 is a block diagram of a computer system 100 in accordance with a preferred embodiment of the present invention. Computer system 100 includes a first computer 110 and a second computer 120. First computer 110 and second computer 120 are connected together via line 106, which can be, for example, a LAN, WAN and an internet connection. Line 106 can also represent a wireless connection, such as a cellular network connection.

First computer 110 includes a CPU 102; a memory 104; input/output lines 105; an input device 150, such as a keyboard or mouse; and a display device 160, such as a display terminal. Memory 104 of first computer 110 includes browser software 130 and Hypertext Markup Language (HTML) 135. A person of ordinary skill in the art will understand that memory 104 also contains additional information, such as application programs, operating systems, data, etc., which are not shown in the figure for the sake of clarity.

Second computer 110 includes a CPU 102' and a memory 104'. Memory 104' of second computer 120 includes server software 140 and Hypertext Markup Language (HTML) 145. HTML 135 in the memory of first computer 110 was downloaded over line 106 from HTML 145 of second computer 120. A person of ordinary skill in the art will understand that memory 104' also contains additional information, such as application programs, operating systems, data, etc., which are not shown in the figure for the sake of clarity. Server 140 and HTML 145 can also be located in memory 104 of first computer 110.

It will be understood by a person of ordinary skill in the art that computer system 100 can also include numerous elements not shown in the Figure for the sake of clarity, such as disk drives, keyboards, display devices, network connections, additional memory, additional CPUs, LANs, input/output lines, etc. A preferred embodiment of the invention runs under the Solaris operating system, Version 2.5. Solaris is a registered trademark of Sun Microsystems, Inc. The present invention allows for the use of tooltips in Web Pages. Thus, any information displayed on display device 160 by browser 130 can have a tooltip associated therewith. When the user places the cursor on a predetermined location on display device 160 for a predetermined period of time, tooltip text is displayed, providing further explanation of the information at the predetermined location. In a preferred embodiment, Web Pages specified using the present invention can still be displayed using Web browsers that have not been enhanced to recognize tooltips because these browsers will simply ignore the tooltips tag.

FIG. 2 shows an example of formats of tooltip tags in HyperText Markup Language (HTML) in accordance with a preferred embodiment of the present invention. The format of conventional HTML is described in, for example, Morris, "HTML for Fun and Profit," SunSoft Press 1995, which is herein incorporated by reference. FIG. 2 shows three alternate HTML formats for a tooltip tag. A first format 210 includes a first text string 212 surrounded by brackets ("<" and ">"). The characters "TOOLTIP TXT=" are followed by tooltip information, specifying characters that are displayed on a Web Page as a tooltip. In a preferred embodiment having sufficiently fast access time, the tool information can also be a reference to a file name, such as "HREF=http://server.com/filename", but doing so is only recommended when it would take within 1.0 second after the user places the cursor over the anchor text for the tooltip to appear. A tooltip also could be an icon or other illustration, indicated by <TOOLTIP IMG SRC=foo.gif>.

Next, a second text string 214 (displayed info) identifies information that is displayed on a Web Page. The displayed info can identify any information that has a visual appearance on display device 160, including images, literal character strings and, animations (given a system of sufficient response time). Thus, for example, tooltips can be used to explain an icon if the displayed information identifies a file containing the graphical information of an icon. Next, a third text string 216 surrounded by brackets ("<" and ">") consists of the string "/TOOLTIP" to indicate the end of the tooltip tag.

Second format 220 includes a first text string 222 surrounded by brackets ("<" and ">"). The first text string includes the characters "TOOLTIP TXT" followed by characters that are displayed on a Web Page as a tooltip, followed by the string "EVERYWHERE". Next are second and third text strings 224, 226 similar to those of the first format 210. A tooltip tag having an EVERYWHERE attribute applies to all occurrences of the displayed info on the Web page. Thus, the page author need only author a single tooltip tag even if it is to be used to explain multiple occurrences of displayed information.

Third format 230 includes a first text string 232 surrounded by brackets ("<" and ">"). The first text string includes the characters "TOOLTIP TXT=", followed by characters that are displayed on a Web Page as a tooltip, followed by the string "EVERYWHERE BELOW". Next are second and third text strings 234, 236 similar to those of the first format 210. A tooltip tag having an EVERYWHERE BELOW attribute applies to all occurrences of the displayed info on the Web page located below the tooltip tag on the page. Thus, the page author can "turn on" a tooltip for all locations below the tooltip tag and the tooltip can be used to explain multiple occurrences of a specific code below a certain point on the page.

Fourth format 240 includes a <TOOLTIP ALLOFF> tag that turns off all "EVERYWHERE" tooltips in the rest of the file. If no ALLOFF tag appears, the EVERYWHERE tag remains in force for the rest of the page.

FIG. 3 shows an example of a Web page displayed on display device 160 of FIG. 1. The page includes lines 302 and 304. Line 302 reads as follows:

UA 15-FEB-96 0931 LHR SFO 5368 6710 12078

Although it is clear from the column heading that "LHR" represents a "From City," it is not necessarily clear what "LHR" stands for.

FIG. 4 shows an example of a Web Page with a tooltip displayed thereon in accordance with a preferred embodiment of the present invention. In the example of FIG. 4, the user has placed the cursor over the text "LHR" on line 302 and has let the cursor remain stationary for a predetermined period of time, such as three seconds. After the cursor has remained in place over the displayed information "LHR" for the predetermined period of time, the tooltip text "London Heathrow" is displayed, indicating that "LHR" is an abbreviation for "London Heathrow." In a preferred embodiment, any piece of information displayed on display device 160 can have an associated tooltip.

For example, the HTML to display line 302 looks like this:

<TOOLTIP TXT="Universal Airlines"
EVERYWHERE>UA</TOOLTIP>15-FEB-96
0931<TOOLTIP TXT="London Heathrow"

EVERYWHERE>LHR</TOOLTIP><TOOLTIP
TXT="San Francisco" EVERYWHERE>SFO
</TOOLTIP>5368 6710 12078

Figure 5A:
FIGS. 5(*a*) through 5(*c*) show respective examples of HTML tooltip tags in accordance with the formats of FIG. 2.
Figure 5B:
Figure 5C:

FIGS 5(a) through 5(c) show respective examples of HTML tooltip tags that could have been used to specify the tooltip of FIG. 4. The tooltip tags of FIG. 5 could be used in the HTML to display the tooltip for "LHR" of line 302. The tooltip tag 501 of FIG. 5(a) causes the tooltip text "London Heathrow" to be associated only with the occurrence of "LHR" in line 302 (assuming that the tooltip tag is part of the HTML specifying line 302). The tooltip tag 502 of FIG. 5(b) causes the tooltip text "London Heathrow" to be associated with the occurrences of "LHR" in both lines 302 and 304 (see FIG. 8). The tooltip tag 503 of FIG. 5(c) causes the tooltip text "London Heathrow" to be associated with the occurrence of "LHR" in both lines 302 and 304 (see FIG. 8) (assuming that the tooltip tag 503 is part of the HTML for line 302). If the tooltip tag of FIG. 5(c) occurs below the HTML for line 302, then the tooltip text is associated only with the occurrence of "LHR" in line 304).

Figure 6A:
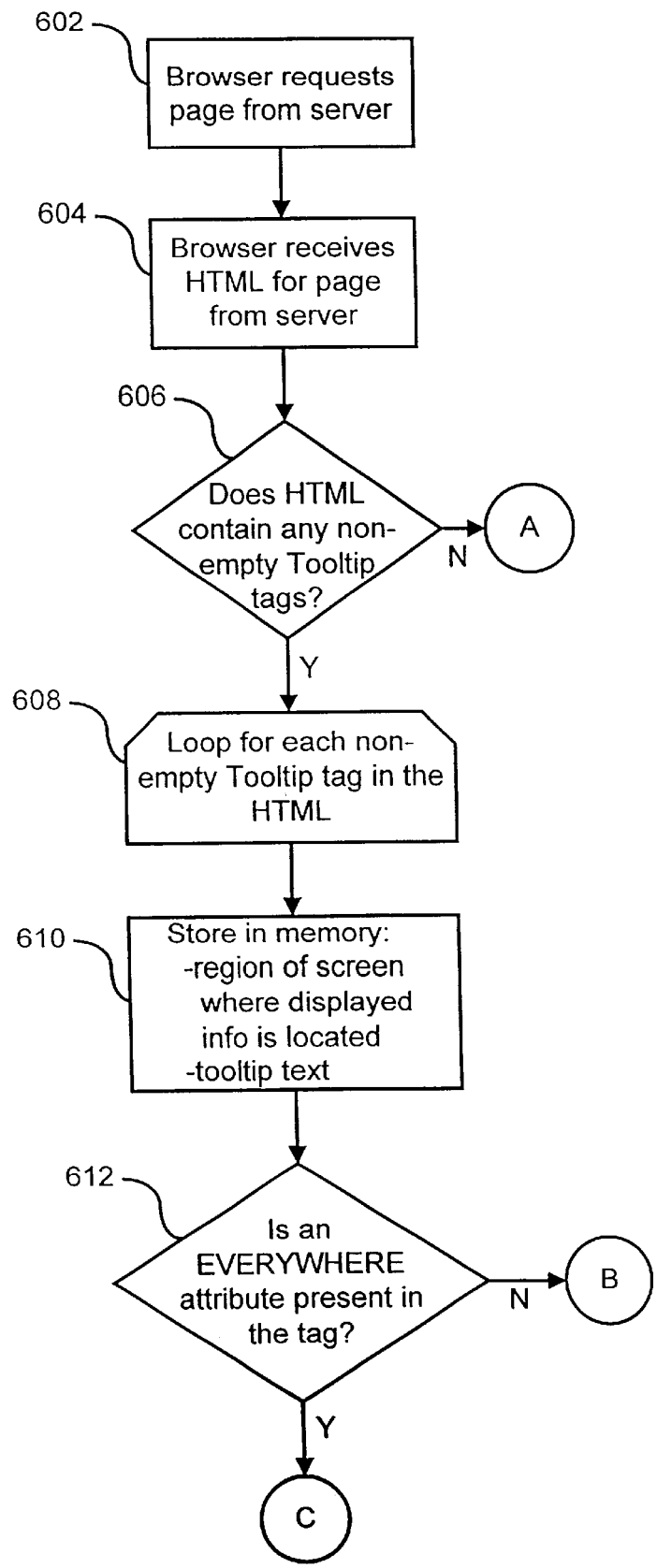
FIGS. 6(*a*) and 6(*b*) are flow charts showing steps performed by browser software prior to displaying the Web Page of FIG. 3.
Figure 6B:
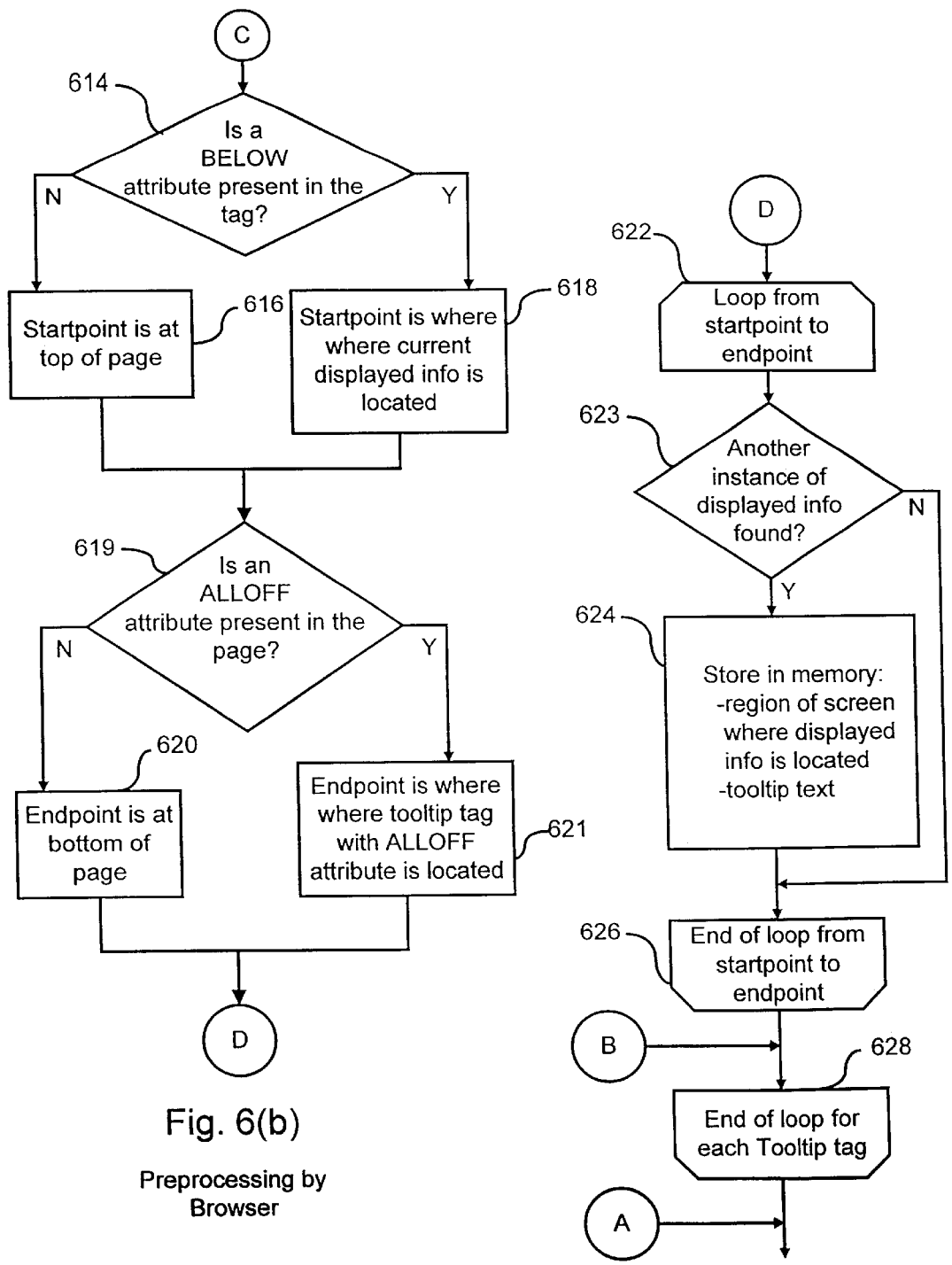

FIGS. 6(a) and 6(b) are flow charts showing steps performed by browser software 130 preferably prior to displaying the Web page of FIG. 3. It will be understood by persons of ordinary skill in the art that the steps of flow charts in this document are performed by CPU 102 executing the instructions of browser 130 in accordance with HTML 135. Initially, in step 602, the browser requests HTML 145 for a page from server 140. In step 604, the server sends the requested HTML, which is stored as HTML 135 in memory 104. In step 606, the browser determines whether HTML 135 contains any non-empty tooltip tags. If so, certain initialization steps need to be performed.

Step 608 represents the top of a loop performed for each non-empty tooltip tag in HTML 135. An empty tooltip tag is a tooltip tag missing either the tooltip text or the displayed info. In step 610, the browser determines where the displayed info is displayed on display device 160 and stores in memory the region of the display device on which the displayed info is displayed. The browser also stores the tooltip text in association with the region information.

In step 612, if the tooltip tag has an EVERYWHERE attribute, then it may be necessary to store information concerning other occurrences of the displayed info on the page. Otherwise, control passes to step 628. If an EVERYWHERE attribute is present, in step 614, the browser determines whether there is a BELOW attribute present. If not, a startpoint is set to be the top of the page. If a BELOW attribute is present, the startpoint is set to where the displayed text is located on the page.

In step 619, if an ALLOFF tag is present, an endpoint is set to the location on the page of the ALLOFF tag in step 620. If no ALLOFF tag is present, the endpoint is set to the end of the page in step 621.

Step 622 represents the beginning of a loop performed from the startpoint of the page to the endpoint of the page. In step 623, if another occurrence of the displayed text is located, then the browser stores in memory the region of the display device on which the displayed info is displayed in step 624. The browser also stores the tooltip text in association with the region information. Steps 626 and 628 represent the end of their respective loops.

The test to determine whether another occurrence of the displayed info is as follows:

The core string is the string of characters between the initial <TOOLTIP> tag with any HTML tags removed. Also any whitespace characters in the beginning or the end of the string are removed.

Full word matching is defined as follows:

The first character of a string being matched must meet at least one of the following conditions:

1) It must be the first character on a line or the first character in the file.
2) The character immediately before the character must be the end of an HTML tag (typically a ">").
3) The character immediately before the character must be a whitespace character or a punctuation character.

The last character of a string being matched must meet at least one of the following conditions:

1) It must be the last character on a line or the last character in the file.
2) The character immediately after the character must be the beginning of an HTML tag (typically a "<".
3) The character immediately after the character must be a whitespace character or a punctuation character.

"Whitespace" characters are defined depending on the language and character set supported by the browser but typically include SPACE, NULL, and TAB.

"Punctuation" characters are defined depending on the language and character set supported by the browser but typically include, .:;/\^?!'[ ]{ }( )+-*+& % $#.

Figure 8:
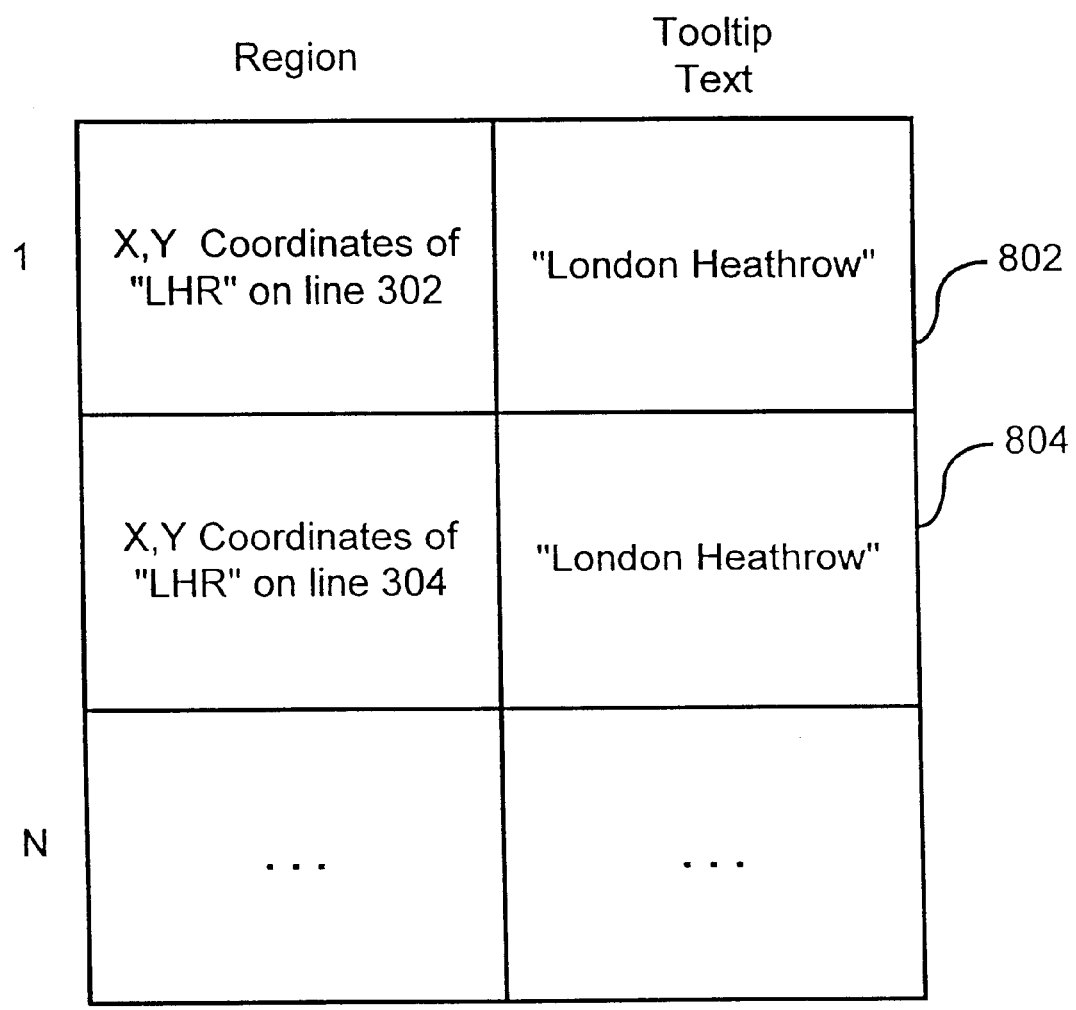
FIG. 8 shows an example of contents of a data structure stored in a memory of FIG. 1.

FIG. 8 shows an example of the contents of the data structure in memory 104 resulting from the steps of FIG. 6. In the data structure, a first entry 802 stores the region on display device 160 where "LHR" is displayed in line 302. Associated therewith is the tooltip text "London Heathrow". A second entry stores the region on display device 160 where "LHR" is displayed in line 304. Associated therewith is the tooltip text "London Heathrow". Thus, whenever the user places the cursor in the region of field 802 or field 804 and leaves the cursor in the region for a predetermined length of time, the tooltip text "London Heathrow" preferably will be displayed in proximity to the displayed info. It will be understood that there may be other entries in the data structure representing other regions and tooltip texts not shown in the example.

Figure 7:
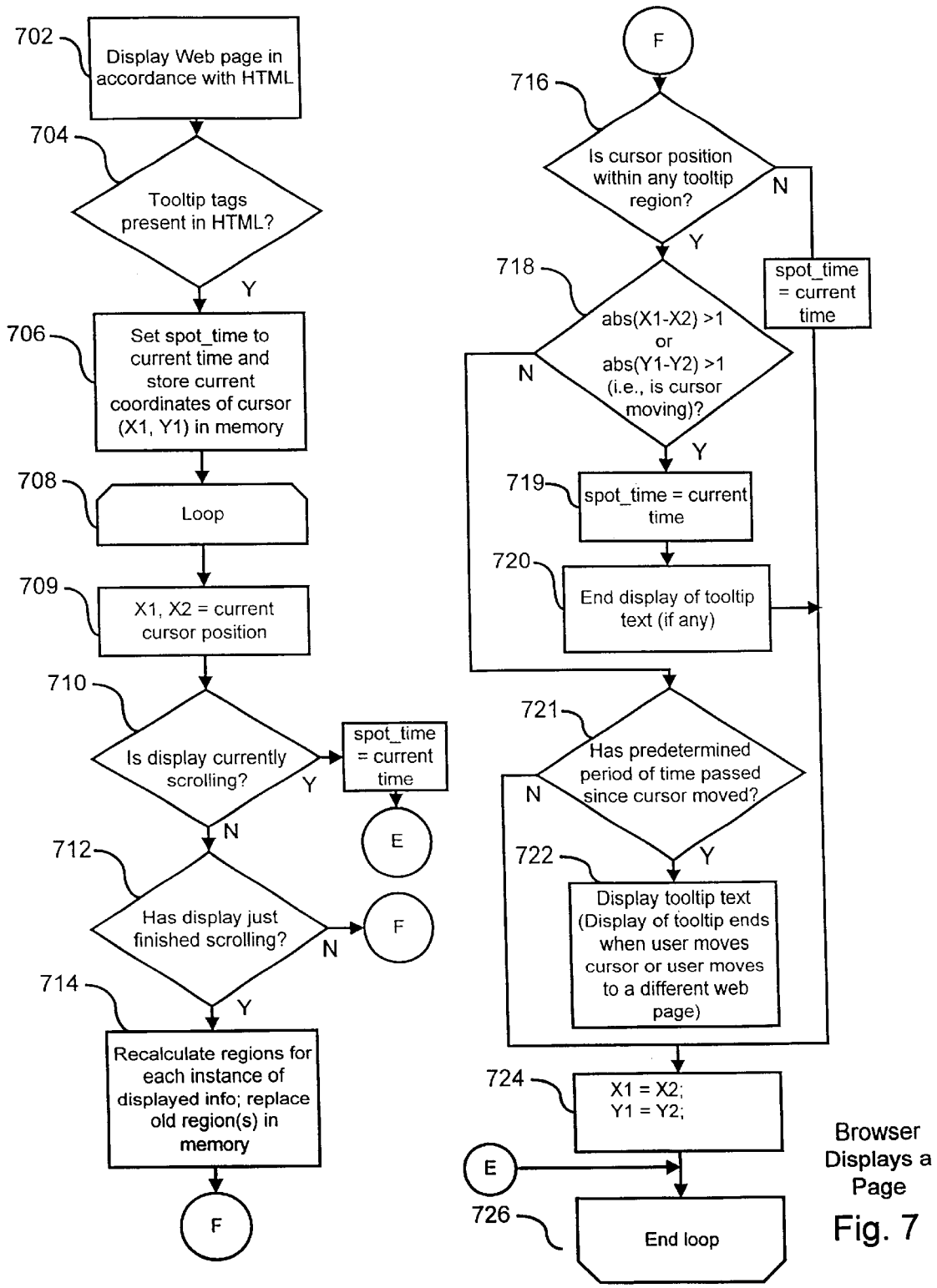
FIG. 7 is a flow chart showing steps performed by the browser software to display the Web Page of FIG. 4.

FIG. 7 is a flow chart showing steps performed by browser 130 to display the Web page of FIG. 4 in accordance with the data structure of FIG. 8. In step 702, the page of FIG. 3 is shown on display device 160 in accordance with HTML 135, in a manner known to persons of ordinary skill in the art. The steps of FIG. 6 are also performed at this time. It will be understood that there are other steps (not shown) that are performed by browser 130 to display a web page and to accept input from the user. Many of these steps are not described herein to enhance the clarity of the example.

In step 704, if there are tooltip tags present in HTML 135, the remaining steps of FIG. 7 are performed. Initially, in step 706 the current time is saved as "spot_time" and current coordinates of the cursor are saved as X1 and Y1. Step 708 represents the beginning of a loop. In step 709, the current cursor location is saved as X2 and Y2.

In the described embodiment, tooltip text is not displayed while the page is being scrolled. Although the cursor may pass briefly over displayed text during scrolling, it is not desirable to display tooltip text for the brief time that the cursor is so located. Thus, in step 710, if the display is currently scrolling, spot_time is set to current time and control passes to step 724. In step 712, if the display has just finished scrolling, control passes to step 714, where the region fields of entries 802, 804, etc in memory are recalculated to reflect the new screen location of the displayed info. Otherwise, control passes to step 716.

In step 716, if the current cursor position (X2, Y2) is within a tooltip region, as defined by the region field of FIG.

8, then control passes to step 718. Otherwise spot_time is set to current time and control passes to step 724. In step 718, if the cursor is moving, spot time is set to current time, any current display of tooltip text is ended (step 720) and control passes to step 724. Otherwise, if the cursor is not moving, control passes to step 721. In step 721, if a predetermined time has passed since the cursor stopped moving (determined by current_time—spot_time), then control passes to step 722. Otherwise, control passes to step 724.

In step 722, the cursor has been resting on a tooltip region for a predetermined period of time. The tooltip text associated with the current cursor location (X2, Y2) preferably is displayed in proximity to the displayed info on display device 160. For example, in FIG. 4, the tooltip text "London Heathrow" preferably is displayed in proximity to the displayed info "LHR". As discussed above, the tooltip text is displayed until the cursor is moved or until the user moves to a different web page.

Displaying the tooltip is done by looking up the point denoted by (X2, Y2) in the tooltip data structure for the current page and finding the tooltip text for the screen region that (X2, Y2) falls within. The text preferably is displayed in a yellow rectangle that is positioned one line above the top of this screen region and centered around X2. If placing the rectangle about the region would make it extend beyond the top of the browser window than the rectangle is lowered by as many pixels as it would have extended beyond the top of the browser window. If centering the rectangle around X2 would cause it to extend to the left or the right of the browser window, then the rectangle is moved right or left, respectively, by as many pixels as it would have extended. If the text in the tooltip is so long that the rectangle would be wider than the width of the browser window then the text is word-wrapped to fit within a rectangle the width of the browser window.

Although not shown in FIG. 4, if the tooltip tag of FIGS. 5(b) and 5(c), which include the EVERYWHERE attribute, was included in HTML 135, placing the cursor on "LHR" of line 304 would also cause the browser to display the tooltip text "London Heathrow" near the displayed info "LHR" of line 304. It is also possible to place tooltip tags within other tooltip tags.

In summary, the present invention allows the designer of a web page to include tooltips within the web page. The EVERYWHERE attribute and the BELOW attribute allow the designer of a Web page use only one tooltip tag to specify tooltip text associated with a plurality of occurrences of a displayed text string, using only one tooltip tag. Thus, a plurality of occurrences of displayed information can have the same tooltip text associated therewith as the result of a single tooltip tag inserted within the HTML describing the page. The ALLOFF attribute allows the designer to "turn off" tooltips in the middle of a page.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system comprising:
    means for determining a location on a web page for text for which a tooltip is to be displayed; and
    means for storing an HTML tooltip tag having the format: <TOOLTIP TXT=tooltip information>displayed info</TOOLTIP>
    wherein the the displayed info is text and the tooltip tag is stored in a memory location associated with the location of the displayed info on the web page.

2. The system of claim 1, wherein the HTML tooltip tag is associated with an HTML for any information that may be displayed by a browser.

3. The system of claim 1, wherein the HTML tooltip tag is an extension of an HTML describing the web page.

4. The system of claim 1, wherein the tooltip tag includes an EVERYWHERE attribute indicating that the tooltip should be displayed on the web page for every occurrence of the displayed info in the HTML.

5. The system of claim 1, wherein the tooltip tag includes an EVERYWHERE BELOW attribute indicating that the tooltip should be displayed on the web page for every occurrence of the displayed info below the tooltip tag in the HTML.

6. The system of claim 1, wherein the tooltip tag includes an ALLOFF attribute indicating that the tooltip should not be displayed on the web page for any occurrence of the displayed info below the displayed info corresponding to the tooltip tag.

7. A system comprising:
    means for receiving HTML that includes a TOOLTIP TXT tag, the tag including a text and a tooltip corresponding to the text;
    means for reviewing the HTML to determine a coordinate position within a display region on a display device where the text will be displayed;
    means for storing the coordinate position and the tooltip;
    means for displaying the text at the coordinate position within the display region;
    means for detecting that a cursor is positioned for a predetermined length of time within the display region that includes the text;
    means for retrieving the stored tooltip; and
    means for displaying the tooltip on the display device in proximity to the text.

8. The system of claim 7, wherein the predetermined time is three seconds.

9. The system of claim 7, further comprising:
    means for ending the display of the tootip when the cursor is moved.

10. The system of claim 7, further comprising:
    means for ending the display of the tootip when a different web page is displayed.

11. The system of claim 7, wherein the displayed tooltip is text.

12. The system of claim 7, wherein the displayed tooltip is graphic.

13. The system of claim 7, wherein the displayed tooltip includes information retrieved from a file.

14. The system of claim 7, wherein the displayed info is an icon.

15. The system of claim 7, wherein the HTML includes a description of a web page to be displayed.

16. The system of claim 15, wherein the displayed tooltip represents text.

17. The system of claim 15, wherein the displayed tooltip represents a graphic.

18. The system of claim 15, wherein the displayed info represents an icon.

19. The system of claim 15, wherein the processor ends the display of the tooltip when a different web page is displayed.

20. The system of claim 7, wherein the HTML includes any information displayed on the display device by a browser.

21. The system of claim 1, wherein the displayed info includes any information that has a visual appearance on the display device such as images, literal character strings, and animations.

22. A system for displaying tooltips, comprising:

means for receiving a Web page including displayed info;

means for receiving at least one tooltip tag;

means for determining, from the at least one tooltip tag, a Web page portion of the Web page to which a tooltip of the tooltip tag is applicable;

means for determining one or more occurrences of the displayed info that are included within the Web page portion; and means for causing the tooltip to be displayed in conjunction with a curser being positioned within a tooltip region corresponding to an occurrence of the displayed info.

23. A system according to claim 22, wherein the at least one tooltip tag includes an attribute indicating at least one of a startpoint and an endpoint of the Web page portion.

24. A system according to claim 22, wherein the at least one tooltip tag includes an attribute indicating that the Web page portion includes the Web page.

25. A system according to claim 22, wherein the at least one tooltip tag includes an attribute indicating a startpoint of the Web page portion as a corresponding occurrence of the displayed info.

26. A system according to claim 22, wherein the at least one tooltip tag includes an attribute indicating an endpoint of the web page portion as a corresponding occurrence of the displayed info.

27. A system according to claim 22, wherein the at least one tooltip tag includes at least one attribute selected from a group including an EVERYWHERE attribute, a BELOW attribute and an ALLOFF attribute.

28. A system according to claim 22, wherein the displayed info includes at least one of text and graphical information.

29. A system according to claim 22, wherein the tooltip includes at least one of text and graphical information.

30. A system according to claim 22, further comprising forming a data structure indicating an occurrence and a corresponding tooltip region, and wherein the causing the tooltip to be displayed is conducted according to data stored in the data structure.

31. A data structure formed using the system of claim 30.

* * * * *

UNITED STATES PATENT AND TRADEMARK OFFICE
CERTIFICATE OF CORRECTION

PATENT NO. : 6,819,336 B1
DATED : November 16, 2004
INVENTOR(S) : Jakob Nielsen

It is certified that error appears in the above-identified patent and that said Letters Patent is hereby corrected as shown below:

Column 8,
Line 1, after "wherein the", delete "the" (second occurrence).

Column 10,
Line 18, before "forming", insert -- means for --.
Line 19, after "wherein the" and before "causing", insert -- means for --.
Line 20, "is conducted" should read -- operates --.

Signed and Sealed this

Eighteenth Day of January, 2005

JON W. DUDAS
*Director of the United States Patent and Trademark Office*